Figure 1:
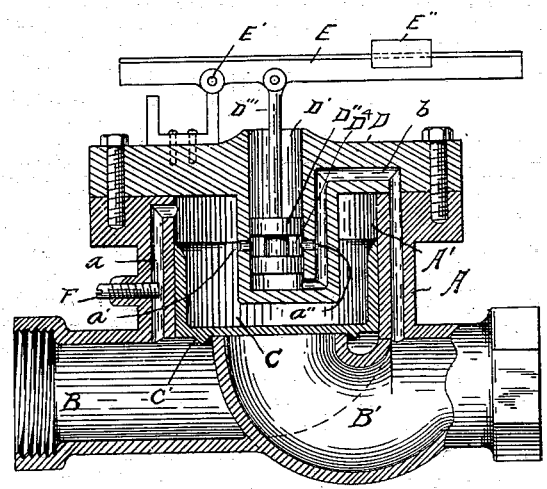

No. 651,927. Patented June 19, 1900.
E. A. MARSH.
PRESSURE REGULATING VALVE.
(Application filed Mar. 10, 1899.)

(No Model.)

WITNESSES
Chas. Wisner
C. Jennings

INVENTOR
Elon A. Marsh
By Parker & Burton
Attorneys.

UNITED STATES PATENT OFFICE.

ELON A. MARSH, OF BATTLE CREEK, MICHIGAN.

PRESSURE-REGULATING VALVE.

SPECIFICATION forming part of Letters Patent No. 651,927, dated June 19, 1900.

Application filed March 10, 1899. Serial No. 708,492. (No model.)

*To all whom it may concern:*

Be it known that I, ELON A. MARSH, a citizen of the United States, residing at Battle Creek, county of Calhoun, State of Michigan, have invented a certain new and useful Improvement in Pressure-Regulating Valves; and I declare the following to be a full, clear, and exact description of the invention, such as will enable others skilled in the art to which it pertains to make and use the same, reference being had to the accompanying drawings, which form a part of this specification.

This invention relates to pressure-regulating valves, and has for its object an improvement in valves that are intended to be used in systems of water distribution where it is desired for any purpose to reduce the high pressure in the water-main to a lower pressure in the service-pipe.

The invention is especially useful in those systems of water distribution where the pressure in the water-main is liable to sudden and considerable variations of pressure, and the valve embodying the invention is capable of reducing or will reduce either a very high or a moderately high pressure to any given or desired lower pressure, and the pressure in the service-pipe will be constant, although the pressure in the main may vary greatly.

The valve is equally adapted for use in connection with any other fluids than water, generally speaking, the character of the fluid being entirely immaterial. The reduction of pressure being accomplished by the valve, it follows that the outflow from the delivery end of the service-pipe is constant without regard to the pressure of fluid in the main.

The device is extremely simple, easily made, and is not liable to get out of order because of its simplicity. When fluids under pressure pass through an orifice to a lower pressure, the velocity of said orificial discharge varies as the square root of the net pressure. When the difference of pressure is constant, the amount of fluid which will pass through an orifice varies directly as the area of the orifice. When the size of the orifice is fixed by the lift of the valve and said valve is operated in one direction by fluid-pressure and in the other and opposing direction by a spring, so that the valve itself acts as a piston, the compression of said spring, and consequently the orificial capacity of the reducing-valve, varies directly as the net pressure. From the law of hydraulics already stated it is evident that when the orificial area varies directly as the net pressure the amount of fluid discharged at various pressures varies as the square root of the pressure. Without a variation of pressure fluids will not move at all, and if a conduit having fluids under pressure has an orifice (no matter how small) there will be a flow of the fluid and a proof that at the mouth of said orifice the pressure is reduced. Unless the supply-pipe in this type of pressure-reducer is large compared with the orifice through the valve the power of the fluid to oppose the tension of the spring is weakened by the flow and consequent reduction of pressure, as the orifice enlarges by the opening of the valve. If the pressures before and after reduction approximate closely, the energy of the fluid to move the valve is nearly imperceptible. On the other hand, if these pressures are widely different the power of the fluid to move the valve is greater and the range of power to operate the valve is greater than the range of pressure employed. To obviate this difficulty, a secondary chamber is employed in the more successful class of reducing-valves heretofore made, and in this secondary chamber are located the spring and piston, which by a rod connection operate the reducing-valve. Thus modified the regulator approximates by complication of its parts and structure more nearly to a device wherein the variation in the opening of the valve is directly as the pressure. Manifestly any method of operating a reducing-valve which does not result in orificial variation proportional to the square root of the pressure employed is radically wrong and cannot approximate to theoretic results except with springs of specific tension operating within narrow limits of variation in pressure.

By the device herein shown and described I am able to construct a reducing-valve wherein the orificial capacity varies as the square root of the pressure employed. Moreover, the mechanism employed is of the simplest and most practical form and is not limited in its action to any known pressures. Without modification it is at once a pressure-regulator or reducing-valve and a volumeter. With equal facility it controls the flow of gases and of other fluids, and its efficiency is not impaired by the weakening of pressure due to orificial variation.

Specifically the device consists of a piston-valve whose opposite sides are exposed to differential pressures obtained from the fluid under pressure as it passes into the cylinder containing the piston-valve and out again through orifices of predetermined or variable area.

Figure 2:
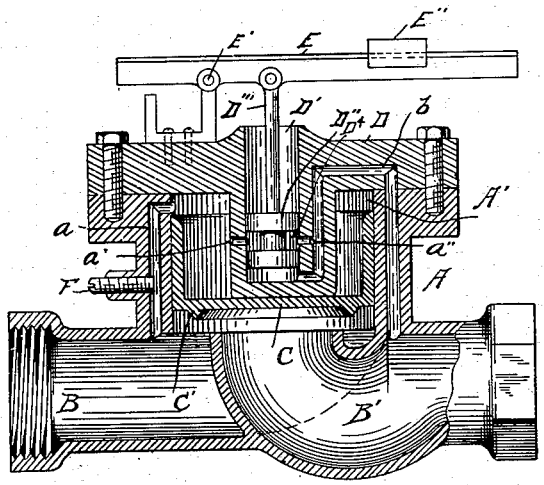

In the drawings, Figure 1 shows a longitudinal vertical section of the valve with the valve closed. Fig. 2 shows the valve open.

A is the main casing or body of the device, and A' is a cylindrical chamber formed in said main body.

B is an inlet-passage connected with the high-pressure pipe, and B' is the outlet or low-pressure passage.

C is a piston nicely but loosely fitted to the bore of the cylinder A'.

C' is an annular flange on the lower part of the piston C. The inner wall of this flange expands in diameter as it recedes from the surface of the piston, and the area of its least internal diameter, as shown, is equal to one-half the area of the diameter of the piston C.

D is the cylinder-cover, provided with a cylindrical chamber D', whose walls hang into the chamber A'.

D'' is a small piston operating in the cylinder D'.

$D^4$ is an annular groove in the piston D'', midway between the ends thereof.

D''' is a connecting-rod pivoted at one end to the piston D' and at its opposite end to the lever E.

E' is a fulcrum of the lever E, and E'' is a weight arranged to slide along the lever E.

$a$ is a small passage leading from the passage B to the chamber A'.

$a'$ is a small passage leading from the chamber A' to the chamber D', between the upper and lower ends of the piston D''.

$b$ is a passage leading from the chamber D' below the piston D'' to the outlet-passage B'.

$a''$ is a small passage opposite to the passage $a'$, leading from the chamber D' to the passage $b$.

F is a set-screw for regulating the capacity or cross-sectional area of the passage $a$.

The operation of this device is as follows: When the parts are in position shown in Fig. 1 and a fluid under pressure is admitted into the chamber B, the valve-piston C, having a portion of its lower area exposed to this pressure, will be lifted from its seat on the orifice between the passages B and B' and the fluid will pass through said orifice. Simultaneously the fluid under pressure will pass through the passage $a$ into the chamber A' and exert a downward pressure upon the piston C. It will also escape through the passages $a'$ and $a''$ into the passage $b$, and finally into the outlet-passage B'. As soon as there is any pressure in the passage B' there will be back pressure in the passage $b$, and when the pressure in the passages B' and $b$ is sufficient to raise the piston D'' the passage $a'$ will be restricted or closed by the rise of the piston D'', and the pressure in chamber A' will approximate to that in chamber B, and the piston-valve C will close and press tightly upon its seat. If the pressure in chamber B' is then reduced, the passage $a'$ will again open by the fall of the piston D'', (now actuated by the weight E'',) and the pressure in the chamber A', which holds the piston-valve C to its seat, will be reduced and allow the main valve to leave its seat. The set-screw F provides means for regulating the capacity of the passage $a$. The function of the piston C is to respond by movement to variations of pressure in the chamber A' caused by the flow of fluids under pressure into and out of said chamber through passages $a$ $a'$, whose areas relative to each other are variable. If these two passages—one leading into and the other leading out of the chamber A'—are of equal area and the same quantity of fluid passes through each in a given time, it will be proof that the net pressure which produces such flow will be the same in each case. Thus if the pressure in chamber B is one hundred pounds to the square inch and the pressure in the chamber B' is two pounds to the square inch the pressure in chamber A' will be intermediate, or fifty-one pounds on the square inch. Again, if the outlet-passage $a'$ has an area smaller than the inlet-passage $a$ the same quantity of water cannot pass through it in a given time, except at a greater velocity, and such increased velocity is attainable only with a higher relative pressure. If the relative pressure in the chamber A' is higher, the piston will have greater power to close the main valve, and if said relative pressure in the chamber A' is reduced the valve tends to open wider.

To establish any constant pressure in the low-pressure chamber B', facilities are afforded by the lever-arm E and weight E'', since the weight E'' is movable along the lever-arm E, and if carried beyond the fulcrum E', so as to overbalance the weight of the piston D'' and its connected parts, the passage $a'$ will be closed and the device becomes inoperative as a pressure-regulator; but it will perform the functions of a stop-valve to the extent of holding the valve tightly to its seat.

What I claim is—

In a fluid-pressure regulator, a high-pressure chamber B, a low-pressure chamber B', and an auxiliary chamber A', a piston-valve C, adapted to be raised by the pressure in the chamber B, acting against a part of one of its surfaces, and closed by a pressure in the chamber A', a chamber D', a piston D'', provided with a groove $D^4$, in the chamber $D'$, a passage $a$, between the chambers B, and $A'$, a passage $a'$, between the chambers $A'$, and $D'$, between the ends of the piston $D''$, a passage $b$, communicating with the chamber $D'$, below the piston $D''$, and with the chamber $B'$, a passage $a''$, between the cylinder $D'$, and passage $b$, between the ends of the piston $D''$, and means for weighting the piston $D''$, substantially as shown and described.

In testimony whereof I sign this specification in the presence of two witnesses.

ELON A. MARSH.

Witnesses:
 CHARLES F. BURTON,
 MARION A. REEVE.